US011323787B1

(12) United States Patent
Leigh et al.

(10) Patent No.: US 11,323,787 B1
(45) Date of Patent: May 3, 2022

(54) MULTI-CHIP PHOTONIC NODE FOR SCALABLE ALL-TO-ALL CONNECTED FABRICS

(71) Applicant: HEWLETT PACKARD ENTERPRISE DEVELOPMENT LP, Houston, TX (US)

(72) Inventors: Kevin B. Leigh, Houston, TX (US); Luca Ramini, Cernusco sul Naviglio (IT); Mir Ashkan Seyedi, Milpitas, CA (US); Steven Dean, Chippewa Falls, WI (US); Marco Fiorentino, Milpitas, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/086,044

(22) Filed: Oct. 30, 2020

(51) Int. Cl.
*H04J 14/00* (2006.01)
*H04Q 11/00* (2006.01)
*G02B 6/43* (2006.01)

(52) U.S. Cl.
CPC .......... *H04Q 11/0005* (2013.01); *G02B 6/43* (2013.01); *H04Q 11/0066* (2013.01); *H04Q 2011/0052* (2013.01)

(58) Field of Classification Search
CPC .......... H04Q 11/0005; H04Q 11/0066; H04Q 2011/0052; G02B 6/43
See application file for complete search history.

(56) References Cited

U.S. PATENT DOCUMENTS

| | | | |
|---|---|---|---|
| 6,411,752 B1 | 6/2002 | Little et al. |
| 6,674,558 B1 | 1/2004 | Chang et al. |
| 6,892,032 B2 | 5/2005 | Milton et al. |
| 7,130,540 B2 | 10/2006 | Simmons et al. |
| 7,716,271 B1 | 5/2010 | Bertsekas et al. |
| 8,335,434 B2 | 12/2012 | Beausoleil et al. |
| 9,229,163 B2 | 1/2016 | Schwetman et al. |
| 9,316,784 B2 | 4/2016 | Krishnamoorthy et al. |
| 9,621,273 B2 | 4/2017 | Nagarajan |

(Continued)

FOREIGN PATENT DOCUMENTS

| | | |
|---|---|---|
| CN | 102882601 | 4/2015 |
| CN | 106533993 | 4/2019 |

(Continued)

OTHER PUBLICATIONS

Buex et al., "Optical Ring Network-on-Chip (ORNoC): Architecture and Design Methodology," DATE'11: Conference on Design, Automation and Test in Europe, Sep. 2, 2011, 7 pages.

(Continued)

*Primary Examiner* — David C Payne
*Assistant Examiner* — Pranesh K Barua
(74) *Attorney, Agent, or Firm* — Hewlett Packard Enterprise Patent Department

(57) ABSTRACT

A photonic node includes a first circuit disposed on a first substrate and a second circuit disposed on a second substrate different from the first substrate. The first circuit is configured to route light signals originated from the photonic node to local nodes of a local group in which the photonic node is a member. The second circuit is configured to route light signals received from a node of an external group in which the photonic node is not a member, to one of the local nodes.

17 Claims, 9 Drawing Sheets

(56) References Cited

U.S. PATENT DOCUMENTS

| | | |
|---|---|---|
| 9,693,124 B2 | 6/2017 | Robinson et al. |
| 9,893,950 B2 | 2/2018 | Chen et al. |
| 10,564,512 B2 | 2/2020 | Sun et al. |
| 2003/0016411 A1 | 1/2003 | Zhou et al. |
| 2003/0128980 A1 | 7/2003 | Abeles |
| 2009/0110348 A1 | 4/2009 | Bratkovski et al. |
| 2012/0082454 A1 | 4/2012 | Ooi |
| 2012/0237155 A1 | 9/2012 | Zheng et al. |
| 2014/0044015 A1* | 2/2014 | Chen .................. H04L 41/0663 370/255 |
| 2015/0163570 A1* | 6/2015 | Zid ...................... H04J 14/028 398/45 |
| 2015/0168803 A1 | 6/2015 | Xu et al. |
| 2015/0309265 A1* | 10/2015 | Mehrvar .............. G02B 6/3558 398/51 |
| 2017/0223437 A1 | 8/2017 | Lee et al. |
| 2018/0217328 A1* | 8/2018 | Heroux ............... H04B 10/801 |
| 2018/0217344 A1* | 8/2018 | Fini ..................... G02B 6/4243 |
| 2018/0287818 A1* | 10/2018 | Goel ....................... H04L 45/62 |
| 2019/0089461 A1 | 3/2019 | Sun et al. |
| 2020/0287627 A1* | 9/2020 | Johnson ............. H04B 10/1129 |

FOREIGN PATENT DOCUMENTS

| | | |
|---|---|---|
| CN | 110012368 | 7/2019 |
| EP | 1271827 | 2/2003 |

OTHER PUBLICATIONS

Binetti, P.R.A et al., "Indium Phosphide Photonic Integrated Circuits for Coherent Optical Links", IEEE Journal of Quantum Electronics, Feb. 2012, pp. 279-291, vol. 48, No. 2, IEEE.

Cheng, Q. et al., "Recent Advances in Optical Technologies for Data Centers: A Review", Optica, Nov. 2018, pp. 1354-1370, vol. 5, No. 11, Optical Society of America.

Cheng, Q. et al., "Photonic switching in high performance datacenters (invited)", Optics Express, Jun. 8, 2018, pp. 16022-16043, vol. 26, No. 12, Optical Society of America.

Cheng, Q. et al., "Ultralow-crosstalk, strictly non-blocking microring-based optical switch", Photonics Research, Jan. 16, 2019; pp. 155-161, vol. 7, No. 2, Chinese Laser Press.

Mansoor, R. et al., "Review of Progress in Optical Ring Resonators with Crosstalk Modelling in OADMS", https://www.researchgate.net/publication/283150538, Oct. 2015, 11 pages.

Proietti. R. et al., "Self-driving Reconfigurable Silicon Photonic Interconnects (Flex-LIONS) with Deep Reinforcement Learning", SC19, Nov. 2019, 3 pgs., Denver, CO, USA.

Yu, R. et al., "A scalable silicon photonic chip-scale optical switch for high performance computing systems", Optics Express, Nov. 18, 2013, pp. 32655-32667, vol. 21, No. 23, OSA.

Zhu, Z. et al., "Fully programmable and scalable optical switching fabric for petabyte data center", Optics Express, Feb. 5, 2015, pp. 3563-3580, Vo. 23, No. 3, OSA.

Li et al., "Silicon photonic transceiver circuits with microring resonator bias-based wavelength stabilization in 65 nm CMOS", IEEE Journal of Solid—State Circuits, 49(6), 2014, pp. 1419-1436.

* cited by examiner

US 11,323,787 B1

MULTI-CHIP PHOTONIC NODE FOR SCALABLE ALL-TO-ALL CONNECTED FABRICS

STATEMENT OF GOVERNMENT RIGHTS

This invention was made with Government support under Agreement Number H98230-19-3-0002. The Government has certain rights in the invention.

DESCRIPTION OF RELATED ART

There are many interconnect fabric topologies based on either packet switches or optical circuit switches where either high-power and/or expensive switches are needed for a wide range of bandwidth, latency and scalability metrics. In an All-to-All connected system, a group of local nodes are connected to one or more external groups of nodes. Such a system is desirable for high performance computing.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
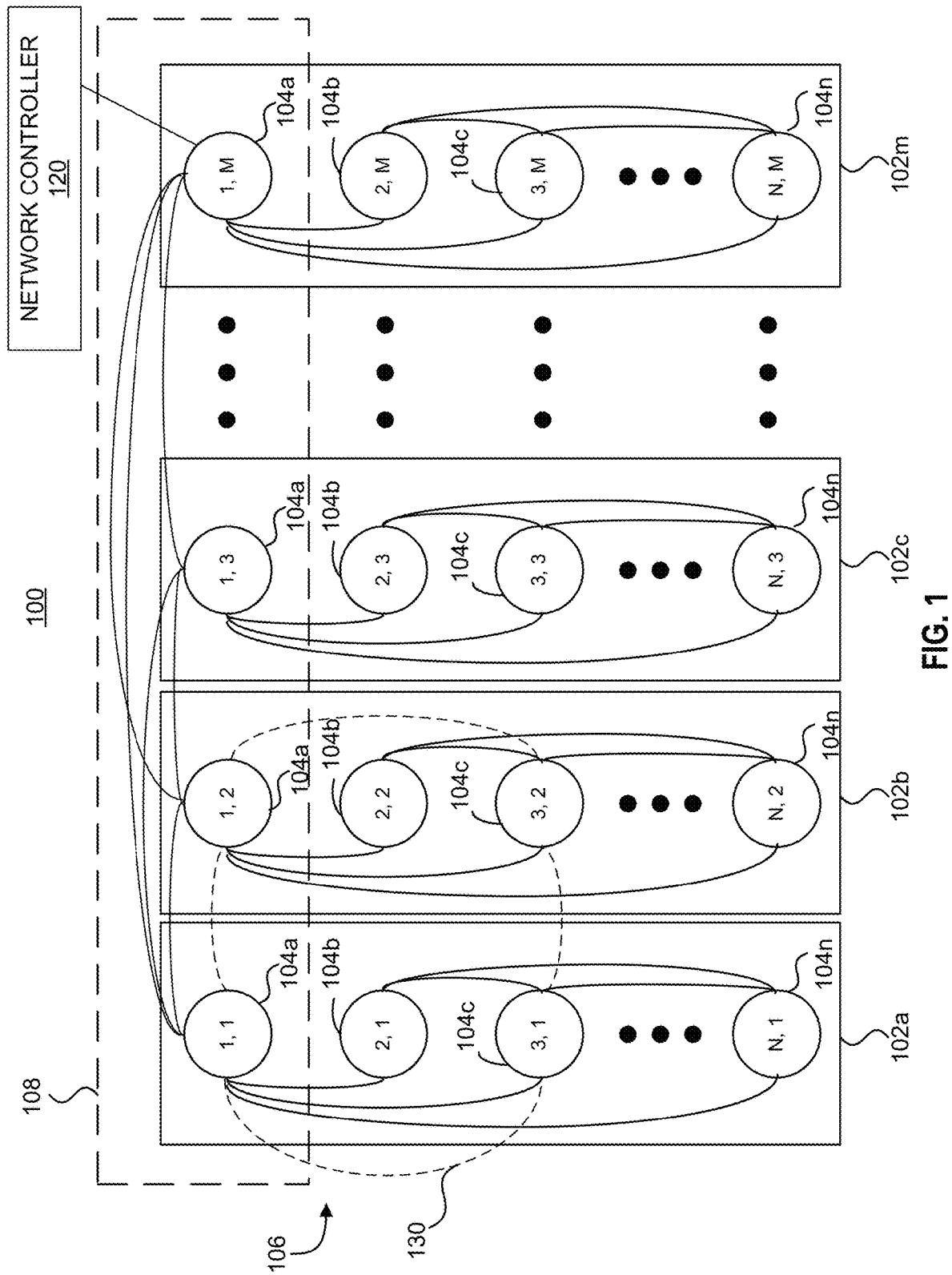
FIG. 1 illustrates an example network within which embodiments of the technology disclosed herein can be implemented

The figures are not exhaustive and do not limit the present disclosure to the precise form disclosed.

DETAILED DESCRIPTION

In a compute fabric, compute nodes are connected to network switches that are in turn interconnected to form a compute fabric. For large compute fabrics, optical transceivers are used to support high-speed signals at longer distances. Network switches have electronic components to function as internal data buffers, crossbar switches, and network processors to encode/decode network packets, all of which translate to through-switch latencies. Optical transceivers perform optical to electrical, and electrical to optical, signal translations causing conversion latencies. Optical fibers further add about 5 ns/meter latency, and therefore longer optical cables used in larger compute networks increase link latencies. All these different latencies are combined to form total path latencies. In addition to latencies, network switches and discrete optical transceivers add significant costs and power consumptions to implement compute fabrics.

As new applications emerged, a class of systems needs to have very high bandwidth (in multiple Tbps). All-to-All connectivity among nodes is needed with lowest latency (e.g., no through-switch buffer congestion or packet decoding/encoding latencies), and at significantly lower cost and power consumption than existing fabric methods (e.g., significantly reduced connectivity and ideally no packet switching costs by not using network switches and discrete optical transceivers).

All-to-All connectivity of N nodes can be achieved using fewer than N(N−1) links with packet switches interconnected using various fabric topologies that also provide path diversities but at the expense of added per-hop through-node latencies. In another instance, all-to-all connectivity of N nodes can be achieved using fewer than N(N−1) links with programmable circuit switches that allow a node to connect to any other node, but one at a time, which provides direct connections without additional through-node latencies but at the expense of path availability wait time. Alternatively, all-to-all connectivity of N compute nodes can be achieved using N(N−1) links for a direct fully-connected fabric that provides independent, parallel, and direct connections from each compute node to all other compute nodes without using switches. Since compute nodes are directly connected, through-switch latencies are eliminated by totally avoiding the use of network switches, at the expense of using increase number of cables to directly and fully interconnect N compute nodes. These methods may be flexibly deployed and highly scalable.

Various embodiments describe a network system that includes all-to-all connected fabric where each compute node uses compute electronics and a multi-chip photonic node. Each multi-chip photonic node comprises electronic interfaces to compute electronics, signal conversions between electrical and optical domain, and optical signal interfaces for external optical cables. Therefore, compute nodes are directly interconnected via integrated photonic nodes (one for each compute node) and external optical cables where signals are routed in the optical domain. In other words, there are no network switches and discrete optical transceivers. Each of the photonic node may include multiple quad-node loop (QNL) routers/circuits (as explained in connection with FIGS. 2-7). In some embodiments, a photonic node is configured with modular granularity and may include one or more chips, dies, or circuits on a die using silicon photonic technologies. A photonic node may comprise an electronic die electrically coupling to a photonic die where the electronic die may be on top of the photonic die, and the photonic die may be on top of a photonic node substrate that may be electrically coupled to a system PCB. Some electronic components on the electronic die may electrically couple to electro-optical components on the photonic die underneath it. Some other electronic components on the electronic die may be electrically coupled to system electronics by interfacing through the photonic die, the photonic node substrate, and the system PCB, using vias, solder balls and solder pads. In some examples, a via may be a through-silicon via. In some other examples, a via may be a PCB via. Optical connectors may be present on the photonic die for optical signals to be coupled to optical fibers. In some embodiments, a heat extraction device may be coupled on the top surface of the electronic die. All-to-All connectivity is scaled by increasing/decreasing numbers of compute nodes within a group and/or increasing/decreasing number of groups in the network. Hereafter, the term "node" generically refers to a compute node, and the term "photonic node" refers to the fabric interface portion within a compute node.

A photonic node consistent with techniques disclosed herein may include a first circuit on a chip/die that is configured to handle all neighbor-to-neighbor node communications within a local group of nodes. In some embodiments, this first circuit may also be configured to handle pass-through signals from a node of an external group destined to one of the neighbor nodes. The photonic node may include a modular second circuit on another chip/die that is configured to handle pass-through signals from a node of an external group destined to one of the neighbor nodes, while the modular second circuit handles no neighbor-to-neighbor communications within the group. When more external groups and nodes are added to the network system, the photonic node can be configured to handle the increased traffic by adding one or more modular second circuits thereto without re-configuring the first circuit.

FIG. 1 illustrates an example network 100 within which embodiments of the technologies disclosed herein can be implemented. The example network 100 is provided for illustrative purposes only and should not limit the scope of the technologies to only the depicted embodiment. For ease of discussion, the network 100 is depicted as a high-performance computing (HPC) system, but the technology is not limited to only HPC systems or environments. The technologies of the present disclosure is applicable to any network or system in which data is transmitted over an optical interconnect. As shown in FIG. 1, the network 100 can comprise a plurality of groups 102a-m (generally, "the group 102," collectively, "the groups 102."). Each group 102 comprises a plurality of nodes 104a-n (generally, "the node 104," collectively, "the nodes 104."). In FIG. 1, the group 102a includes nodes 104 denoted as (1, 1), (2, 1), (3, 1) ... (N, 1); group 102b includes nodes 104 denoted as (1, 2), (2, 2), (3, 2) ... (N, 2); group 102c includes nodes 104 denoted as (1, 3), (2, 3), (3, 3) ... (N, 3); and group 102n includes nodes 104 denoted as (1, M), (2, M), (3, M) ... (N, M). In FIG. 1, the node is labeled as (x, y) where x presents a node number in the group while y presents its group number. Other types of node labeling are contemplated. Each of the nodes 104 may be a compute node that uses a photonic node to interface to the network 100.

In various embodiments, the nodes 104 may comprise servers, accelerators or other computing devices including one or more processors. In various embodiments, each group 102 can comprise the same number of nodes 104. In various embodiments, the groups 102 may be co-located in the same location (e.g., the same data center, the same rack within a data center).

Each node 104 can include a photonics interface system having a circuit or circuits (as illustrated and described in more detail below with respect to FIGS. 3-7) configured to enable the node 104 to transmit to optical signals and receive optical signals from other nodes 104 within the network 100. Each of the nodes 104 within each group 102 can be directly connected over an optical cable to each of the other nodes 104 within the same group 102. An optical cable may comprise optical fibers for optical transmit and receive signals. Plurality of optical cables that interconnect nodes may be referred to as an optical interconnect fabric. The photonic interface system of each node 104 can also be directly connected to at least one node of every other different group 102 over an optical interconnect fabric 106. In FIG. 1 each line between groups represents the at least one direct connection from a node 104 of a first group 102 to a node 104 of a second group different from the first group within the network 100.

In various embodiments, each of the nodes 104 in the network 100 can include a network controller 120. The network controller 120 may be configured to manage the connectivity operations of a node 104 within the network 100.

The nodes 104 in the network 100 are dimensionally all-to-all connected to each other. The nodes 104 in the same group 102 are all-to-all connected to each other with direct local links in a first dimension (e.g., vertically in network 100). Each connected local link is between two ports of the nodes 104 having the same wavelength for direct communications. In addition, the nodes in the same row (e.g., 108) belonging to different groups are all-to-all connected to each other with direct global links in a second dimension (e.g., horizontally in the network 100). As can be appreciated, the vertical and horizontal dimensions illustrated in FIG. 1 are provided as a non-limiting example. Different network topologies may invoke different dimensions.

Any two nodes 104 in a first group 102 and corresponding two nodes 104 in a second group 102 in the same rows as the two nodes 104 in the first group 102 may form a quad-node loop (QNL) as an optical router. For example, referring to FIG. 1, a QNL 130 includes the nodes (1, 1) and (3, 1) of the group 102a and the nodes (1, 2) and (3, 2) of the group 102b (connected in dash lines). For description purpose, intra-group communications between nodes 104 in the same group 102 are referred to local communications, while intergroup communications between nodes 104 in the different groups 102 are called global communications. In one QNL, nodes of the same group are called "local neighbors (or local neighbor nodes)," while nodes of different groups connected by a direct link are called "global twins (or global twin nodes)." In the QNL 130, the nodes (1, 1) and (3, 1) of the group 102a are a pair of local neighbors; the nodes (1, 2) and (3, 2) of the group 102b are another pair of local neighbors. The Intergroup nodes (3, 1) and (3, 2) are a pair of global twins, and the nodes (1, 1) and (1, 2) are another pair of global twins.

In some embodiments, communications/signals within one QNL may be transmitted either clockwise or counterclockwise. In some embodiments, depending on system implementation, communications/signals within one QNL can only be clockwise or counterclockwise system-wise. For example, in QNL 130, when the node (1, 1) in the group 102a desires to send a signal to the node (3, 2) in the group 102b, the signal is transmitted from the node (1, 1) to its local neighbor node (3, 1), and then from the node (3, 1) to its global twin node (3, 2). In this example, the node (3, 1) is a pass-through node as the signal goes through it without being extracted or converted. In another instance, the signal can be transmitted from the node (1, 1) to its global twin node (1, 2), and then from the node (1, 2) to its local neighbor node (3, 2). In this example, node (1, 2) is a pass-through node.

Figure 2:
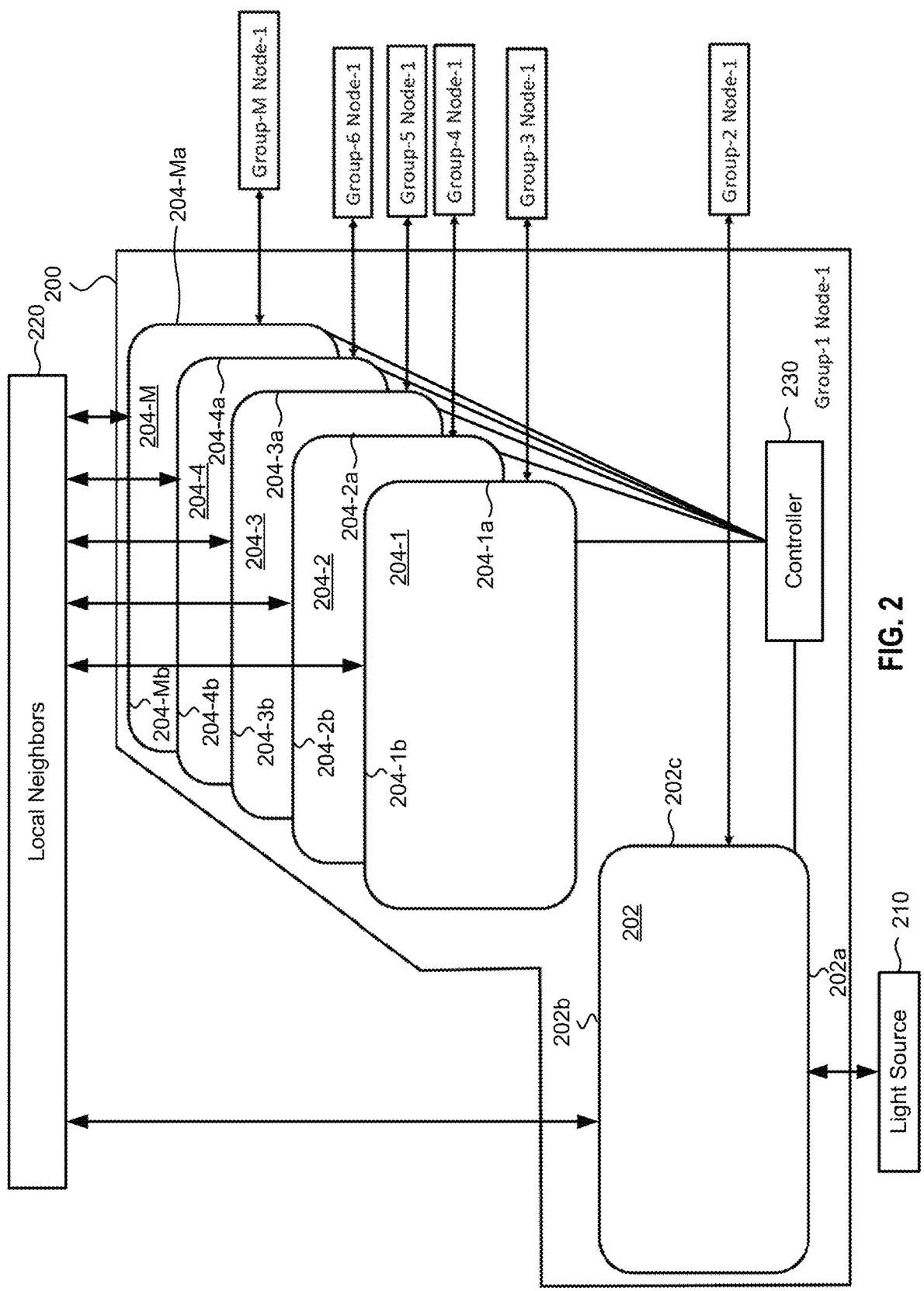
FIG. 2 is a diagram illustrating a node consistent with various embodiments of this disclosure.

To implement the communications in network 100, each of the nodes 104 in the network 100 is equipped with a photonic node. Reference is now made to FIG. 2. FIG. 2 is a diagram illustrating a node 200 consistent with various embodiments of this disclosure. The node 200 may be any one of the nodes 104 illustrated in FIG. 1 (e.g., node 200 can be node (1, 1) in the group 102a). For purpose of describing various embodiments, the node 200 is assigned to "Group-1" (or "local group"), "Node-1" (or "local node") as illustrated in FIG. 2. The node 200 includes a first data slice/ circuit chip 202 and one or more second data slices/circuit chips 204-1, 204-2, 204-3, 204-4 . . . 204-M (generally, "the second data slice 204," collectively, "the second data slices 204"). The first data slice 202 has a local ingress interface 202a configured to receive a light source 210, a local communication interface 202b configured to communicate with the local neighbors 220 (e.g., the nodes (2, 1), (3, 1) . . . (N,1) in FIG. 1) of the local group (e.g., Group-1 in FIG. 2 or group 102a in FIG. 1) in which the node 200 (e.g., the node (1, 1)) is a member, and, optionally, a global communication interface 202c configured to communicate with a node of an external group (e.g., the group 102b in FIG. 1) in which the node 200 is not a member. For example, the global communication interface 202c of the first data slice 202 is coupled to and configured to communicate with Node-1, Group-2 (e.g., the node (1, 2) of the group 102b).

Each of the second data slices 204 includes a global communication interface configured to communicate with a node of an external group (e.g., the group 102c in FIG. 1) in which the node 200 is not a member, and a local communication interface configured to communicate with the local neighbors 220 (e.g., the nodes (2, 1), (3, 1) . . . (N,1) in FIG. 1) of the local group (e.g., Group-1 in FIG. 2 or group 102a in FIG. 1). For example, the global communication interface 204-1a of the second data slice 204-1 is coupled to and configured to communicate with Node-1, Group-3; the global communication interface 204-2a of the second data slice 204-2 is coupled to and configured to communicate with Node-1, Group-4; the global communication interface 204-3a of the second data slice 204-3 is coupled to and configured to communicate with Node-1, Group-5; the global communication interface 204-4a of the second data slice 204-4 is coupled to and configured to communicate with Node-1, Group-6; and the global communication interface 204-Ma of the second data slice 204-M is coupled to and configured to communicate with Node-1, Group-M. The second data slices 204-1, 204-2, 204-3, 204-4 . . . 204-M have local communication interfaces 204-1b, 204-2b, 204-3b, 204-4b . . . 204-Mb, respectively, to communicate with the local neighbors 220.

The node 200 further includes a controller 230 (e.g., a network interface controller (NIC)) configured to control the operations of the node 200. In some embodiments, the controller 230 may include one or more processors and memory that stored instructions executable by the one or more processors. The controller 230 is coupled to each of the first data slice 202 and the second data slice(s) 204 to control communications with the local neighbors 220 and the externals groups.

The first data slice 202 includes a first circuit (as will be explained in connection with FIGS. 3-6) disposed on a substrate. The first circuit is configured to route light signals originated from the node 200 (e.g., the node (1, 1) in FIG. 1) to the local neighbors 220 (e.g., the nodes (2, 1), (3, 1) . . . (N,1) in FIG. 1). Each of the second data slice 204 includes a second circuit (as will be explained in connection with FIG. 7) disposed on a second substrate different from the first substrate. The second circuit is configured to route light signals received from a node (e.g., the node (1, 3) in FIG. 1) of an external group (e.g., Group-3 to Group-M in FIG. 2 or the group 102c in FIG. 1) to one of the local neighbors 220. In some embodiments, optionally, the first circuit is further configured to route light signals received from a node of an external group (e.g., Group-2 in FIG. 2) to one of the local neighbors 220 (e.g., the nodes (2, 1), (3, 1) . . . (N,1) in FIG. 1). Each of the second data slices 204 may be a modular chip or die to accommodate system expansion or reduction. For example, when more external groups are added to the network system, one or more second data slices may be added to each of the nodes in the network system.

In some embodiments, the node 200 may be referred to as a photonic node when the electronic control part (e.g., the controller 230) is provided outside of the node 200.

Figure 3:
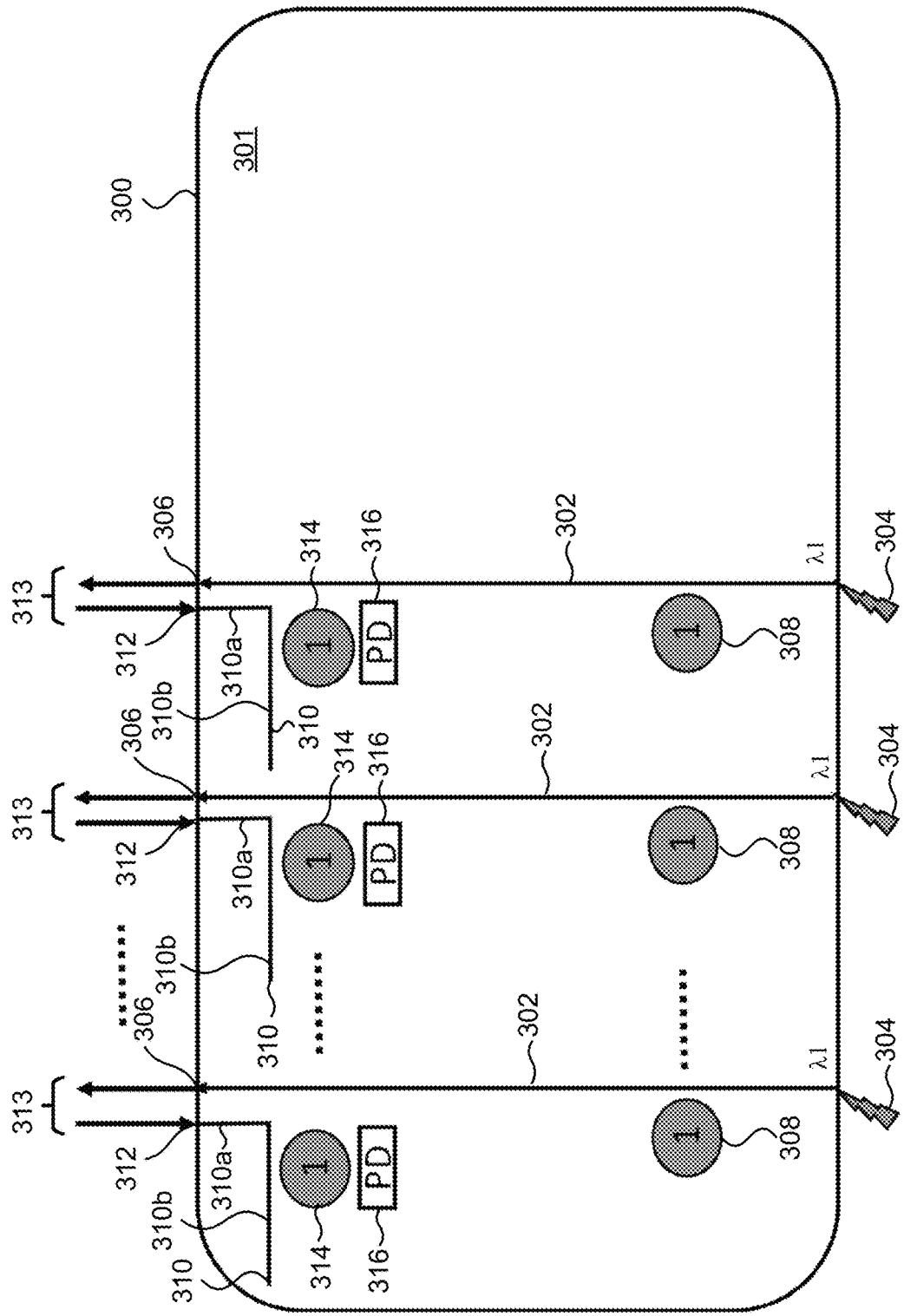
FIG. 3 is a diagram illustrating a first circuit of a photonic node, according to one example embodiment.

Reference is now made to FIG. 3. FIG. 3 is a diagram illustrating a first circuit 300 of a photonic node, according to one example embodiment. For example, the first circuit 300 may be included in the first data slice 202 of FIG. 2. The first circuit 300 is configured to transmit local direct communications to and receive local direct communications from local neighbors. That is, the first circuit 300 is configured to handle all local direct communications between the local node and local neighbor nodes. The first circuit 300 includes a photonic die substrate 301 that is underneath an electronic die substrate (not shown). Hereafter the photonic die substrate 301 will be simply referred to as "substrate." A plurality of local-transmit waveguides 302 may be disposed on the substrate 301. Each of the local-transmit waveguides 302 has a first end coupled to a light source 304 and a second end coupled to a local output port 306. The first circuit 300 further includes a plurality of light modulators 308 disposed on the substrate 301. Each of the light modulators 308 is disposed near a corresponding local-transmit waveguide 302 and configured to modulate light from the light source 304 to generate optical signals destined for a respective local neighbor. Each of the light modulators 308 may be coupled to an electrical laser driver component on an electronic die (not shown) interfacing to the photonic die substrate 301.

In some embodiments, the light sources 304 can be of the same wavelength or different wavelengths. In the illustrated example in FIG. 3, the light sources 304 are of the same wavelength $\lambda 1$. As a result, the light modulators 308 are each configured to modulate wavelength $\lambda 1$ as indicated by the illustrated label "1" for the light modulators 308. Each of the output ports 306 is configured to output light signals transmitted on the local-transmit waveguide 302 to a different local neighbor.

In some embodiments, each of the light sources 304 may be a single-wavelength light source that provides a signal wavelength to its corresponding local-transmit waveguide 302. Each of those single-wavelength light sources may provide the same wavelength or a different wavelength.

The first circuit 300 further includes a plurality of local-receive waveguides 310 disposed on the substrate 301. Each of the local-receive waveguides 310 has an end coupled to a local input port 312 configured to receive signals from a local neighbor. In some embodiments, each of the local-receive waveguides 310 may include a first portion 310a and a second portion 310b. The first portion 310a may be in parallel to the local-transmit waveguides 302. The second portion 310b may be extended in a direction that intersects with the first portion 310a. For example, the first portion 310a and the second portion 310b may be orthogonal to each other. Although each of the local-receive waveguides 310 illustrated in FIG. 3 has a shape similar to the letter "L," the disclosure is not so limited. Other arrangements of the local-receive waveguides 310 are possible. For example, each of the local-receive waveguides 310 may be in a shape of a straight line or a wavy line. Each of the first portion 310a is coupled to a local input port 312 that is connected to a local neighbor node. The local output ports 306 and the local input ports 312 may be disposed on the same side of the first circuit 300 to facilitate connection to local neighbor nodes through one or more optical cables 313 and connectors (not shown).

A plurality of local-receive micro-ring resonators 314 are disposed on the substrate 301. Each of the local-receive micro-ring resonators 314 may be a wavelength filter that is disposed adjacent to the second portion 310b of each of the local-receive waveguides 310. Each of the local-receive micro-ring resonators 314 is configured to extract a wavelength. Each of the local-receive micro-ring resonators 314 is coupled to a photodetector (PD) 316. Each of the photodetectors 316 is configured to convert light signals extracted by a corresponding local-receive micro-ring resonator 314 into electrical signals for the local node that has the first circuit 300. Each of the photodetectors 316 may be coupled to an electrical receiver component on an electronic die (not shown) interfacing to the photonic die substrate 301. In the illustrated example in FIG. 3, the wavelength $\lambda 1$ is assigned for all local communications between local neighbors in a group (e.g., one of the groups 102 in FIG. 1). As a result, the local-receive micro-ring resonators 314 are each configured to extract the wavelength $\lambda 1$ as indicated by the illustrated label "1" for the local-receive micro-ring resonators 314. As can be appreciated, each of the local-receive micro-ring resonators 314 may be configured to extract a different wavelength according to wavelength assignments between the local neighbors.

Figure 4:
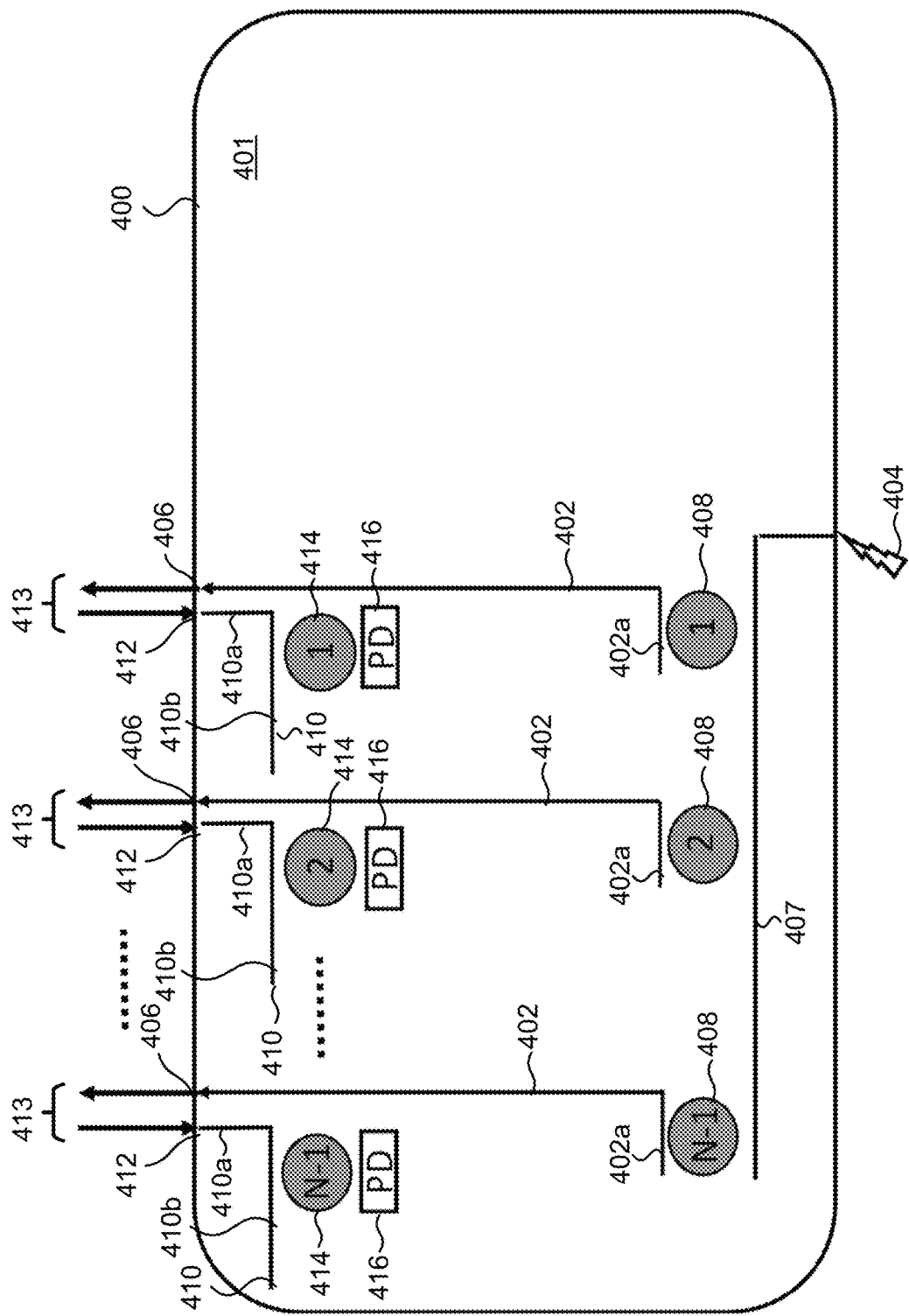
FIG. 4 is a diagram illustrating another first circuit of a photonic node, according to one example embodiment.

FIG. 4 is a diagram illustrating another first circuit 400 of a photonic node, according to one example embodiment. For example, the first circuit 400 may be included in the first data slice 202 of FIG. 2. The first circuit 400 is configured to transmit local direct communications to and receive local direct communications from local neighbors. That is, the first circuit 400 is configured to handle all local direct communications between the local node and local neighbor nodes. The first circuit 400 includes a photonic die substrate 401 that is underneath an electronic die substrate (not shown). Hereafter the photonic die substrate 401 will be simply referred to as "substrate." A plurality of local-transmit waveguides 402 may be disposed on the substrate 401. The first circuit 400 further includes a local light source 404 and local output ports 406, each coupled to a local-transmit waveguide 402. A light-source waveguide 407 is provided on the substrate 401 and configured to guide light from the light source 404. The light-source waveguide 407 is extended in a direction, for example, orthogonal to the direction of the local-transmit waveguides 402. Other arrangements of the light-source waveguide 407 is possible, as long as it can guide the light from local light source 404 to be coupled to plurality of local-transmit waveguides 402.

In some embodiments, the local light source 404 may be a comb laser that can emit multiple different wavelengths of lights into the light-source waveguide 407. The first circuit 400 further includes a plurality of local output light modulators 408, each disposed between an end portion 402a of a respective local-transmit waveguide 402 and the light-source waveguide 407. Each of the local output light modulators 408 is configured to modulate a different wavelength (denoted as 1, 2, . . . , N–1 representing different wavelengths $\lambda 1, \lambda 2, \ldots, \lambda N-1$) to generate optical signals destined for a respective local neighbor. In the example illustrated in FIG. 4, the portions 402a of the local-transmit waveguides 402 may be extended sections from the long axis of the local-transmit waveguides 402. The shape of the portions 402a is not limited to this example, and can be in any other shape as long as they allow the local output light modulators 408 to drop a wavelength extracted from the light-source waveguide 407. Each of the local output light modulators 408 may be coupled to an electrical laser driver component on an electronic die (not shown) interfacing to the substrate 401.

Each of the local-transmit waveguides 402 has another end coupled to a local output port 406. The light signals modulated and dropped by the local output light modulators 408 to the local-transmit waveguides 402 are transmitted to local neighbors through the local output ports 406.

The first circuit 400 further includes a plurality of local-receive waveguides 410 disposed on the substrate 401. Each of the local-receive waveguides 410 has an end coupled to a local input port 412 configured to receive signals from a local neighbor. In some embodiments, each of the local-receive waveguides 410 may include a first portion 410a and a second portion 410b. The first portion 410a is in parallel to the local-transmit waveguides 402. The second portion 410b is extended in a direction that intersects with the first portion 410a. For example, the first portion 410a and the second portion 410b may be orthogonal to each other. Other arrangements of the local-receive waveguides 410 are possible. For example, each of the local-receive waveguides 410 may be in a shape of a straight line or a wavy line. Each of the first portion 410a is coupled to a local input port 412 that is connected to a local neighbor node. The local output ports 406 and the local input ports 412 may be disposed on the same side of the first circuit 400 to facilitate connection to the local neighbor nodes through one or more optical cables 413 and connectors (not shown).

A plurality of local-receive micro-ring resonators 414 are disposed on the substrate 401. Each of the local-receive micro-ring resonators 414 may be a wavelength filter that is disposed adjacent to the second portion 410b of each of the local-receive waveguides 410. Each of the local-receive micro-ring resonators 414 is configured to extract a different wavelength. For example, the local-receive micro-ring resonators 414 are denoted as 1, 2, . . . , N–1 representing their ability to extract different wavelengths $\lambda 1, \lambda 2, \ldots, \lambda N-1$. Each of the local-receive micro-ring resonators 414 is coupled to a photodetector (PD) 416. Each of the photodetectors 416 is configured to convert light signals extracted by a corresponding local-receive micro-ring resonator 414 into electrical signals for the local node that has the first circuit 400. Each of the photodetectors 416 may be coupled to an electrical receiver component on an electronic die (not shown) interfacing to the substrate 401.

Figure 5:
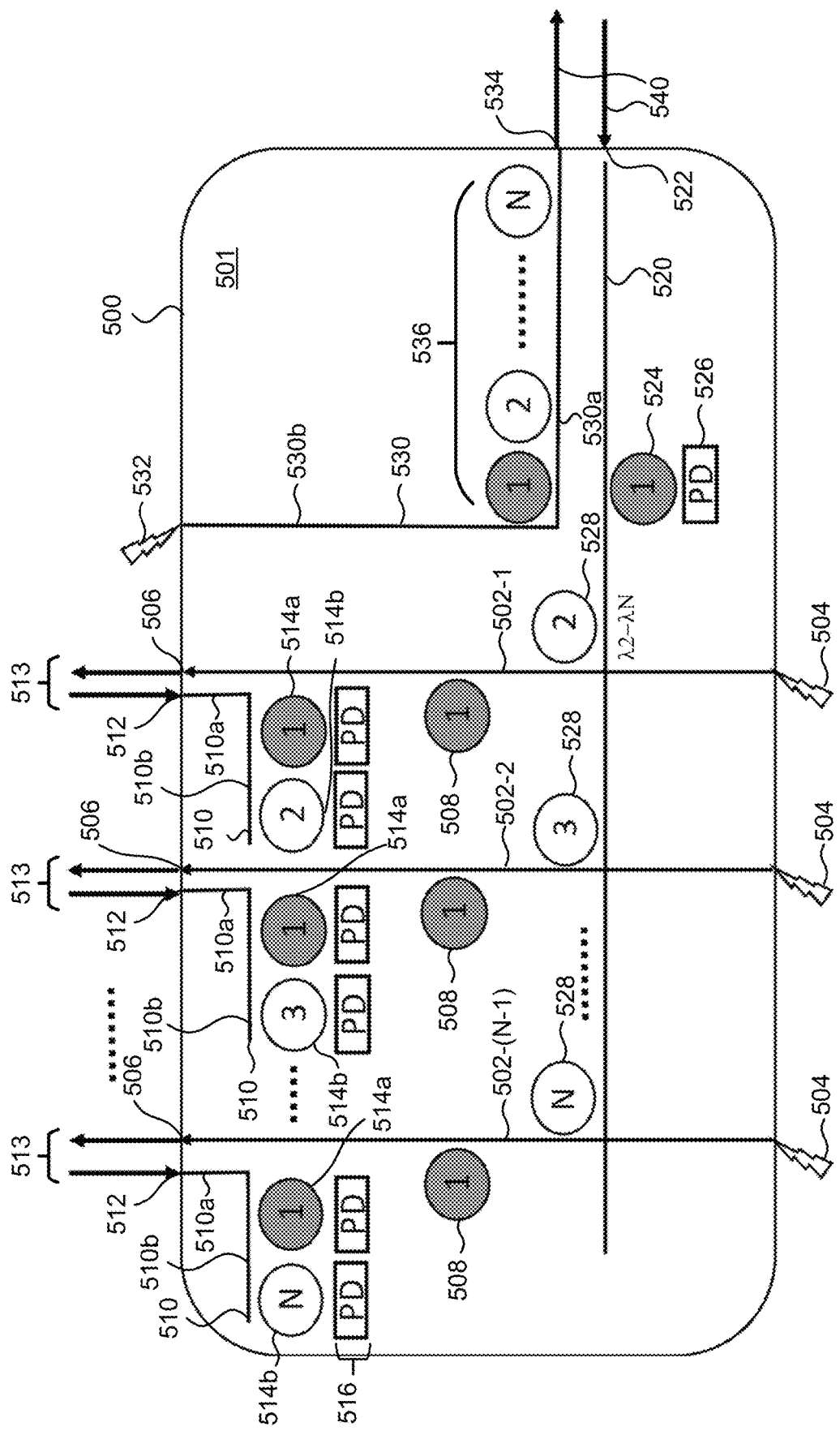
FIG. 5 is a diagram illustrating yet another first circuit of a photonic node, according to one example embodiment.

FIG. 5 is a diagram illustrating yet another first circuit 500 of a photonic node, according to one example embodiment. For example, the first circuit 500 may be included in the first data slice 202 of FIG. 2. The first circuit 500 is configured to transmit local direct communications to and receive local direct communications from local neighbors. Further, the first circuit 500 is configured to route communications received from the global twin node to the local neighbor nodes (e.g., indirect global communications). That is, the first circuit 500 is configured to handle all local direct communications between the local node and the local neighbor nodes and route pass-through communications to the local neighbor nodes.

The first circuit 500 includes a photonic die substrate 501 that is underneath an electronic die substrate (not shown). Hereafter the photonic die substrate 501 will be simply referred to as "substrate." A plurality of local-transmit waveguides 502-1, 502-2, . . . , 502-(N–1) (generally, "the local-transmit waveguide 502," collectively, "the local-transmit waveguides 502") may be disposed on the substrate 501. Each of the local-transmit waveguides 502 has a first end coupled to a light source 504 and a second end coupled to a local output port 506. The first circuit 500 further includes a plurality of light modulators 508 disposed on the substrate 501. Each of the light modulators 508 is disposed near a corresponding local-transmit waveguide 502 and configured to modulate light from the light source 504 to generate optical signals destined for a respective local neighbor. Each of the light modulators 508 may be coupled to an electrical laser driver component on an electronic die (not shown) interfacing to the substrate 501.

In some embodiments, the light sources 504 can be of the same wavelength or different wavelengths. In the illustrated example in FIG. 5, the light sources 504 are of the same wavelength $\lambda 1$. As a result, the light modulators 508 are each configured to modulate wavelength $\lambda 1$ as indicated by the illustrated label "1" for the light modulators 508. Each of the output ports 506 is configured to output light signals transmitted on the local-transmit waveguide 502 to a different local neighbor.

In some embodiments, each of the light sources 504 may be a single-wavelength light source that provides a signal wavelength to its corresponding local-transmit waveguide 502. Each of those single-wavelength light sources may provide the same wavelength or a different wavelength.

The first circuit 500 further includes a plurality of local-receive waveguides 510 disposed on the substrate 501. Each of the local-receive waveguides 510 has an end coupled to a local input port 512 configured to receive signals from a local neighbor. In some embodiments, each of the local-receive waveguides 510 may include a first portion 510a and a second portion 510b. The first portion 510a is in parallel to the local-transmit waveguides 502. The second portion 510b is extended in a direction that intersects with the first portion 510a. For example, the first portion 510a and the second portion 510b may be orthogonal to each other. Other arrangements of the local-receive waveguides 510 are possible. For example, each of the local-receive waveguides 510 may be in a shape of a straight line or a wavy line. Each of the first portion 510a is coupled to a local input port 512 that is connected to a local neighbor node. The local output ports 506 and the local input ports 512 may be disposed on the same side of the first circuit 500 to facilitate connection to local neighbor nodes through one or more optical cables 513 and connectors (not shown).

A plurality of local-receive micro-ring resonators 514 are disposed on the substrate 501. Each of the local-receive micro-ring resonators 514 may be a wavelength filter. A pair of the local-receive micro-ring resonators 514a, 514b is disposed adjacent to each of the local-receive waveguides 510 (e.g., adjacent to the second portion 510b). In some embodiments, a specific wavelength (e.g., $\lambda 1$) is assigned for all local communications among the local neighbors ("local direct communications"). As a result, each local-receive micro-ring resonators 514a is configured to extract a same wavelength (e.g., $\lambda 1$) as indicated by the illustrated label "1" for the local-receive micro-ring resonators 514a. Each local-receive micro-ring resonator 514b is configured to extract a different wavelength (e.g., $\lambda 2, \lambda 3, \ldots, \lambda N$) as indicated by the illustrated labels "2", "3", . . . , "N" for the local-receive micro-ring resonators 514b. These wavelengths (e.g., $\lambda 2, \lambda 3, \ldots, \lambda N$) are assigned for communications between the local node that has the first circuit 500 and nodes of external groups ("global indirect communications or pass-through communications"). For example, a node of an external group may transmit a communication through a direct link to a local neighbor, which then transmits the communication to the first circuit 500 of the local node. This global indirect communication is extracted by one of the local-receive micro-ring resonators 514b.

Each of the local-receive micro-ring resonators 514 is coupled to a photodetector (PD) 516. Each of the photodetectors 516 is configured to convert light signals extracted by a corresponding local-receive micro-ring resonator 514 into electrical signals for the local node. Each of the photodetectors 516 may be coupled to an electrical receiver component on an electronic die (not shown) interfacing to the substrate 501.

The first circuit 500 further includes a global-receive waveguide 520 disposed on the substrate 501. The global-receive waveguide 520 is extended in a first direction (e.g., the horizontal direction in FIG. 5). The local-transmit waveguides 502 are extended in a second direction (e.g., the vertical direction in FIG. 5). The first direction is different from the second direction such that the global-receive waveguide 520 has an intersection with each of the local-transmit waveguides 502. In some embodiments, the first direction and the second direction are orthogonal to each other. In some embodiments, the global-receive waveguide 520 and the local-transmit waveguides 502 may be correlated to each other in other configurations. For example, the local-transmit waveguide 502 may include a section in parallel with the global-receive waveguides 520 as long as signals on the global-receive waveguide 520 can be dropped to the local-transmit waveguides 502.

The global-receive waveguide 520 is coupled to a global input port 522, which is connected to a global twin node of an external group. The first circuit 500 further includes a global-receive micro-ring resonator 524 coupled to the global-receive waveguide 520. The global-receive micro-ring resonator 524 is configured to extract signals transmitted in a specific wavelength (e.g., wavelength $\lambda 1$) for the local node that has the first circuit 500. These signals are called global direct signals as they are signals from the global twin node addressed to the local node. The global-receive micro-ring resonator 524 is coupled to a photodetector (PD) 526. The photodetector 526 is configured to convert light signals extracted by the global-receive micro-ring resonator 524 into electrical signals for the local node. The photodetector 526 may be coupled to an electrical receiver component on an electronic die (not shown) interfacing to the substrate 501.

The first circuit 500 further includes a plurality of micro-ring resonators 528 disposed on the substrate 501. Each of the intersections between the global-receive waveguide 520 and the local-transmit waveguides 502 is provided with a micro-ring resonator 528. Each micro-ring resonator 528 is configured to route/redirect signals of a respective wavelength from the global-receive waveguide 520 at the intersection to one of the local-transmit waveguides 502 at the intersection. Each of the micro-ring resonators 528 is configured to route a different wavelength (e.g., $\lambda 2, \lambda 3, \ldots, \lambda N$) as indicated by the illustrated labels "2", "3", . . . , "N" for the micro-ring resonators 528. These wavelengths (e.g., $\lambda 2, \lambda 3, \ldots, \lambda N$) are assigned for communications between the global twin node and the local neighbors ("global indirect communications or pass-through communications"). For example, the global twin node may transmit a communication through a direct link to the first circuit 500, which then transmits the communication to one of the local neighbors. As a result, the first circuit 500 also routes/redirects the communication from the global twin node to the local neighbor, rendering that the local node that has the first circuit 500 also functions as a pass-through node.

When the global input port 522 receives light signals from the global twin node, the signals (e.g., having wavelength λ1) destined for the local node is extracted by the global-receive micro-ring resonator 524. The rest of the signals (i.e., pass-through signals having wavelengths λ2-λN) are guided by the global-receive waveguide 520 to the micro-ring resonators 528 (e.g., functioned as micro-ring filters for pass-through signals (MRF)). Each of those micro-ring resonators 528 routes/redirects the pass-through signals of a particular wavelength (e.g., λ2, λ3, . . . , or λN) to a corresponding local-transmit waveguide 502. The local-transmit waveguide 502 guides the pass-through signals from the global-receive waveguide 520 to the local output port 506 to be transmitted to a local neighbor node.

The signals on the global-receive waveguide 520 are de-multiplexed as different wavelengths of signals are dropped at the global-receive micro-ring resonator 524 and the staggered micro-ring resonators 528 at the intersections. For example, λ2 is dropped from the global-receive waveguide 520 to the local-transmit waveguide 502-1 by the micro-ring resonator 528 labeled by "2". Similarly, λ3 is dropped from the global-receive waveguide 520 to the local-transmit waveguide 502-2 by the micro-ring resonator 528 labeled by "3", and λN is dropped from the global-receive waveguide 520 to the local-transmit waveguide 502-(N−1) by the micro-ring resonator 528 labeled by "N". The signals on each local-transmit waveguide 502 are multiplexed with the local direct communications (e.g., λ1) modulated by the light modulator 508.

The first circuit 500 further includes a global-transmit waveguide 530 disposed on the substrate 501. In some embodiments, the global-transmit waveguide 530 may have a first portion 530a in parallel with the global-receive waveguide 520 and a second portion 530b coupled to a global-transmit light source 532. The first portion 530a is coupled to a global output port 534 at an end portion of the global-transmit waveguide 530. A plurality of global output light modulators 536 are disposed on the substrate 501 and adjacent to the global-transmit waveguide 530. Each of the global output light modulators 536 may be coupled to an electrical laser driver component on an electronic die (not shown) interfacing to the photonic die substrate 501. Each of the global output light modulators 536 is configured to modulate a different wavelength (where the global output light modulators 536 are denoted as 1, 2, . . . , N representing different wavelengths λ1, λ2, . . . , λN). In some embodiments, global output light modulators 536 are micro-ring modulators for transmit (MRM). The global light source 532 may include any light-emitting devices, such as lasers. In some embodiments, the global light source 532 may be a comb laser that can emit multiple different wavelengths of light into the global-transmit waveguide 530. In some embodiments, the global light source 532 may alternatively be a plurality of single-wavelength lasers with outputs multiplexed on the single waveguide 530. While transit on a global-transmit waveguide 530, the multiple different wavelengths of light from the global light source 532 are modulated by the global output light modulators 536 to generate light signals to be transmitted to a global twin node. The global output port 534 and the global input port 522 may be disposed on the same side of the first circuit 500 to facilitate connection to the global twin node through one or more optical cables 540 and connectors (not shown).

Figure 6:
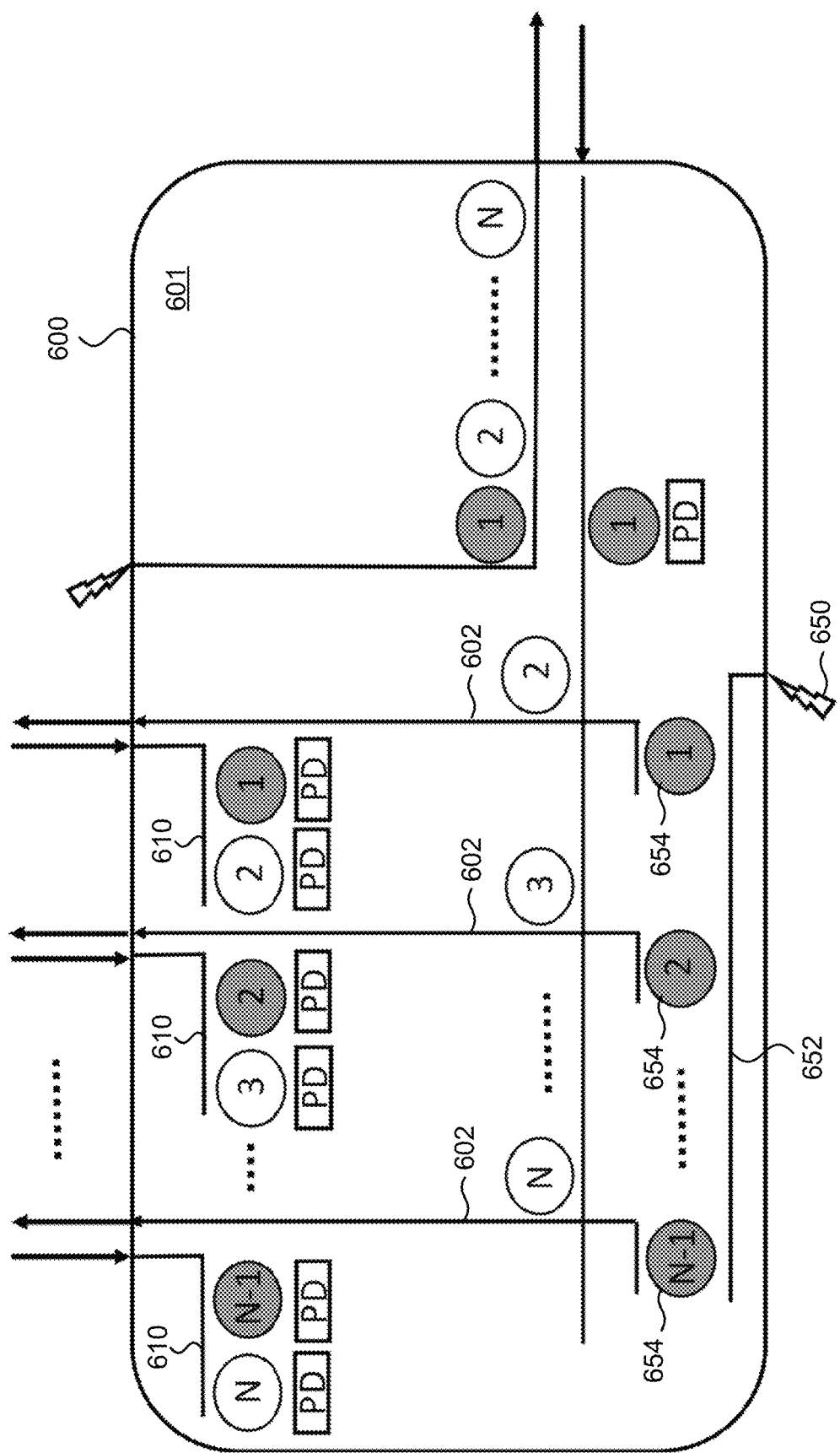
FIG. 6 is a diagram illustrating yet another first circuit of a photonic node, according to one example embodiment.

FIG. 6 is a diagram illustrating yet another first circuit 600 of a photonic node, according to one example embodiment. For example, the first circuit 600 may be included in the first data slice 202 of FIG. 2. The first circuit 600 is configured to transmit local direct communications to and receive local direct communications from local neighbors. Further, the first circuit 600 is configured to route communications received from the global twin node to the local neighbor nodes (e.g., indirect global communications). That is, the first circuit 600 is configured to handle all local direct communications between the local node and the local neighbor nodes and route pass-through communications to the local neighbor nodes.

The first circuit 600 is similar to the first circuit 500 of FIG. 5, except that the multiple light sources 504 of the first circuit 500 are replaced with a single light source 650. In addition, the first circuit 600 further includes a light-source waveguide 652 disposed on the substrate 601 and configured to guide light from the light source 650. The light-source waveguide 652 is extended in a direction orthogonal to the direction of the local-transmit waveguides 602. In some embodiments, the light source 650 may be a comb laser that can emit multiple different wavelengths of light into the light-source waveguide 652.

The first circuit 600 further includes a plurality of local output light modulators 654, each disposed between the light-source waveguide 652 and an end portion of each local-transmit waveguide 602. Each of the local output light modulators 654 is configured to modulate a different wavelength (denoted as 1, 2, . . . , N−1 representing different wavelengths λ1, λ2, . . . , λN−1) to generate optical signals destined for a respective local neighbor. Each of the local output light modulators 654 is configured to drop a wavelength extracted from the light-source waveguide 652 to a local-transmit waveguide 602.

Figure 7:
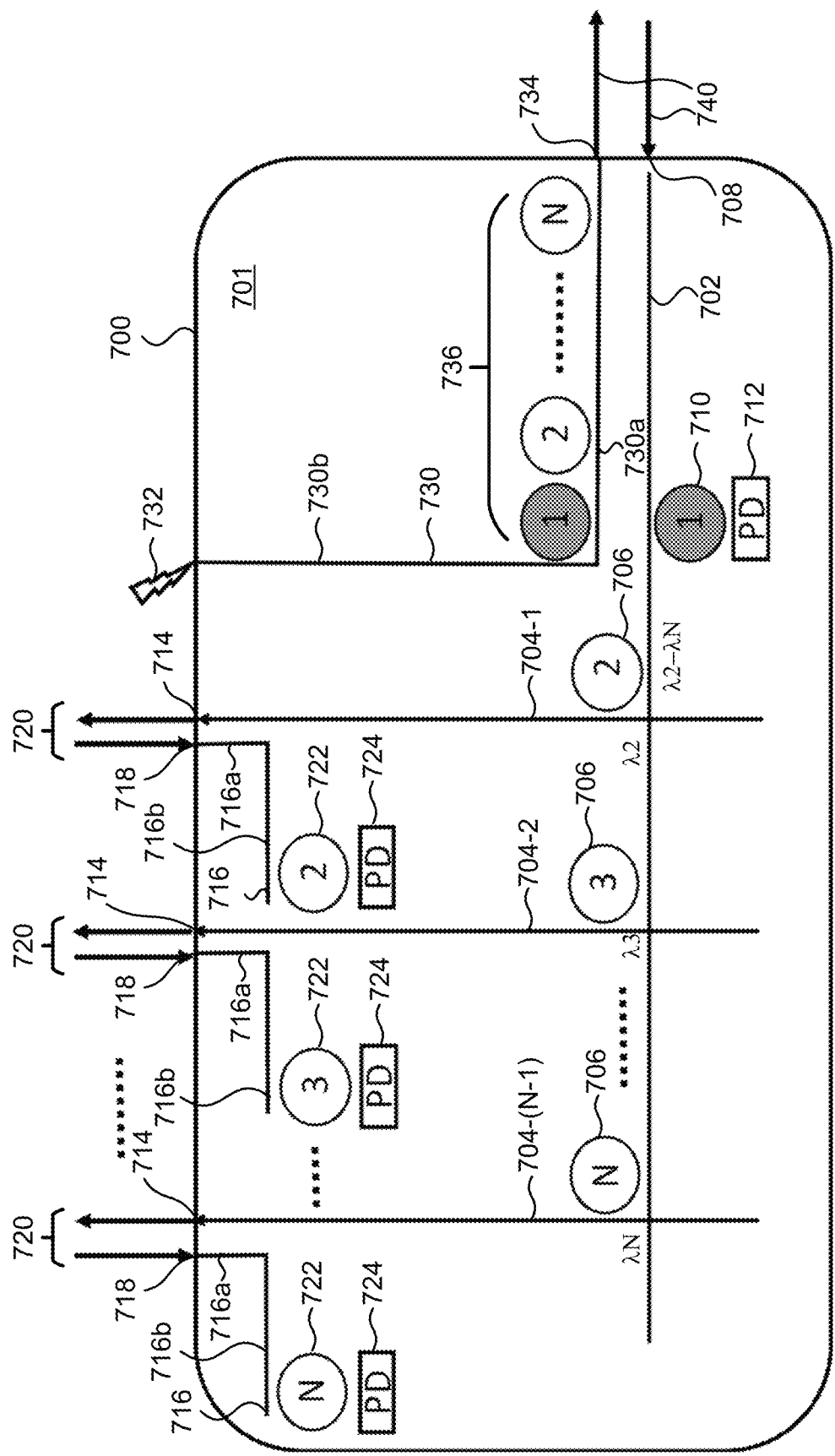
FIG. 7 is a diagram illustrating a second circuit of a photonic node, according to one example embodiment.

FIG. 7 is a diagram illustrating a second circuit 700 of a photonic node, according to one example embodiment. For example, the second circuit 700 may be included in each of the second data slices 204 of FIG. 2. The second circuit 700 is configured to route communications received from a global twin node to the local neighbor nodes (e.g., indirect global communications). That is, the second circuit 700 is configured to route pass-through communications to the local neighbor nodes. In the illustrated embodiment of FIG. 7, the second circuit 700 handles no direct local communications.

The second circuit 700 includes a photonic die substrate 701 that is underneath an electronic die substrate (not shown). Hereafter the photonic die substrate 701 will be simply referred to as "substrate." A global-receive waveguide 702 may be disposed on the substrate 701. The global-receive waveguide 702 is extended in a first direction (e.g., the horizontal direction in FIG. 7). The second circuit 700 further includes a plurality of local-transmit waveguides 704-1, 704-2, . . . , 704-(N−1) (generally, "the local-transmit waveguide 704," collectively, "the local-transmit waveguides 704") extended in a second direction (e.g., the vertical direction in FIG. 7). The first direction is different from the second direction such that the global-receive waveguide 702 has an intersection with each of the local-transmit waveguides 704. In some embodiments, the first direction and the second direction are orthogonal to each other. In some embodiments, the global-receive waveguide 702 and the local-transmit waveguides 704 may be correlated to each other in other configurations. For example, each local-transmit waveguide 704 may include a section in parallel with the global-receive waveguides 702 as long as signals on the global-receive waveguide 702 can be dropped to the local-transmit waveguides 704.

The second circuit 700 further includes a plurality of micro-ring resonators 706 disposed on the substrate 701.

Each of the intersections between the global-receive waveguide 702 and the local-transmit waveguides 704 is provided with a micro-ring resonator 706. Each micro-ring resonator 706 is configured to route/redirect signals of a respective wavelength from the global-receive waveguide 702 at the intersection to one of the local-transmit waveguides 704 at the intersection. Each of the micro-ring resonators 706 is configured to route a different wavelength (e.g., $\lambda 2$, $\lambda 3$, ..., $\lambda N$) as indicated by the illustrated labels "2", "3", ..., "N" for the micro-ring resonators 706. These wavelengths (e.g., $\lambda 2$, $\lambda 3$, ..., $\lambda N$) are assigned for communications between a node of an external group (e.g., a global twin node) and the local neighbors ("global indirect communications or pass-through communications"). For example, a global twin node may transmit a communication through a direct link to the second circuit 700, which then transmits the communication to one of the local neighbors. The second circuit 700 routes/redirects the communication from the global twin to the local neighbor, rendering the local node that has the second circuit 700 a pass-through node.

The global-receive waveguide 702 is coupled to a global input port 708, which is connected to a global twin node of an external group through a direct link. The second circuit 700 further includes a global-receive micro-ring resonator 710 coupled to the global-receive waveguide 702. The global-receive micro-ring resonator 710 is configured to extract signals transmitted in a specific wavelength (e.g., wavelength $\lambda 1$) for the local node that has the second circuit 700. These signals are called global direct signals as they are signals from the global twin node addressed to the local node. The global-receive micro-ring resonator 710 is coupled to a photodetector (PD) 712. The photodetectors 712 is configured to convert light signals extracted by the global-receive micro-ring resonator 710 into electrical signals for the local node. The photodetector 712 may be coupled to an electrical receiver component on an electronic die (not shown) interfacing to the substrate 701.

Each of the local-transmit waveguide 704 is coupled to a local output port 714 connected to a local neighbor node. When the global input port 708 receives light signals from the global twin node, the signals (e.g., having wavelength $\lambda 1$) destined for the local node is extracted by the global-receive micro-ring resonator 710. The rest of the signals (i.e., pass-through signals having wavelengths $\lambda 2$-$\lambda N$) are guided by the global-receive waveguide 702 to the micro-ring resonators 706 (e.g., functioned as microring filters (MRF) for pass-through signals). Each of those micro-ring resonators 706 routes/redirects the pass-through signals of a particular wavelength (e.g., $\lambda 2$, $A3$, ..., or $\lambda N$) to a corresponding local-transmit waveguide 704. The local-transmit waveguide 704 guides the pass-through signals from the global-receive waveguide 702 to a local output port 714 to be transmitted to a local neighbor node.

The signals on the global-receive waveguide 702 are de-multiplexed as different wavelengths of signals are dropped at the global-receive micro-ring resonator 710 and at the "staggered" micro-ring resonators 706 at the intersections. First, the signals destined to the local node is extracted by the global-receive micro-ring resonator 710. The remaining signals are then dropped by the staggered micro-ring resonators 706 to respective local-transmit waveguides 704. For example, $\lambda 2$ is dropped from the global-receive waveguide 702 to the local-transmit waveguide 704-1 by the micro-ring resonator 706 labeled by "2". Similarly, 3 is dropped from the global-receive waveguide 702 to the local-transmit waveguide 704-2 by the micro-ring resonator 706 labeled by "3", and $\lambda N$ is dropped from the global-receive waveguide 702 to the local-transmit waveguide 704-(N−1) by the micro-ring resonator 706 labeled by "N". As illustrated, wavelengths $\lambda 2$, $\lambda 3$, ..., $\lambda N$ are staggered when they are respectively dropped to local-transmit waveguides 704-1, 704-2, ..., 704-(N−1).

The second circuit 700 further includes a plurality of local-receive waveguides 716 disposed on the substrate 701. Each of the local-receive waveguides 716 has an end coupled to a local input port 718 configured to receive signals from a local neighbor. In some embodiments, each of the local-receive waveguides 716 may include a first portion 716a and a second portion 716b. The first portion 716a is in parallel to the local-transmit waveguides 704. The second portion 716b is extended in a direction that intersects with the first portion 716a. For example, the first portion 716a and the second portion 716b may be orthogonal to each other. Other arrangements of the local-receive waveguides 716 are possible. For example, each of the local-receive waveguides 716 may be in a shape of a straight line or a wavy line. Each of the first portion 716a is coupled to a local input port 718 that is connected to a local neighbor node. The local output ports 714 and the local input ports 718 may be disposed on the same side of the second circuit 700 to facilitate connection to local neighbor nodes through one or more optical cables 720 and connectors (not shown).

A plurality of local-receive micro-ring resonators 722 are disposed on the substrate 701. Each of the local-receive micro-ring resonators 722 may be a wavelength filter that is disposed adjacent to the second portion 716b of each of the local-receive waveguides 716. Each of the local-receive micro-ring resonators 722 is configured to extract a different wavelength. For example, the local-receive micro-ring resonators 714 are denoted as 2, 3, ..., N representing their ability to extract different wavelengths $\lambda 2$, $\lambda 3$, ..., $\lambda N$, respectively. Each of the local-receive micro-ring resonators 722 is coupled to a photodetector (PD) 724. Each of the photodetectors 724 is configured to convert light signals extracted by a corresponding local-receive micro-ring resonator 722 into electrical signals for the local node that has the second circuit 700. Each of the photodetectors 724 may be coupled to an electrical receiver component on an electronic die (not shown) interfacing to the substrate 701.

The second circuit 700 further includes a global-transmit waveguide 730 disposed on the substrate 701. In some embodiments, the global-transmit waveguide 730 may have a first portion 730a in parallel with the global-receive waveguide 702 and a second portion 730b coupled to a global-transmit light source 732. The first portion 730a is coupled to a global output port 734 at an end portion of the global-transmit waveguide 730. A plurality of global output light modulators 736 are disposed on the substrate 701 and adjacent to the global-transmit waveguide 730. Each of the global output light modulators 736 is configured to modulate a different wavelength (where the global output light modulators 736 are denoted as 1, 2, ..., N representing different wavelengths $\lambda 1$, $\lambda 2$, ..., $\lambda N$). In some embodiments, the global output light modulators 736 are micro-ring modulators for transmit (MRM). The global light source 732 may include any light-emitting devices, such as lasers. In some embodiments, the global light source 732 may be a comb laser that can emit multiple different wavelengths of light into the global-transmit waveguide 730. In some embodiments, the global light source 732 may alternatively be a plurality of single-wavelength lasers with outputs multiplexed on the single waveguide 730. While transit on a global-transmit waveguide 730, the multiple different wavelengths of light from the global light source 732 are modulated by the global output light modulators 736 to generate light signals to be transmitted to a global twin node. The global output port 734 and the global input port 722 may be disposed on the same side of the second circuit 700 to facilitate connection to the global twin node through one or more optical cables 740 and connectors (not shown). Each of the global output light modulators 736 may be coupled to an electrical laser driver component on an electronic die (not shown) interfacing to the substrate 701.

Figure 8:
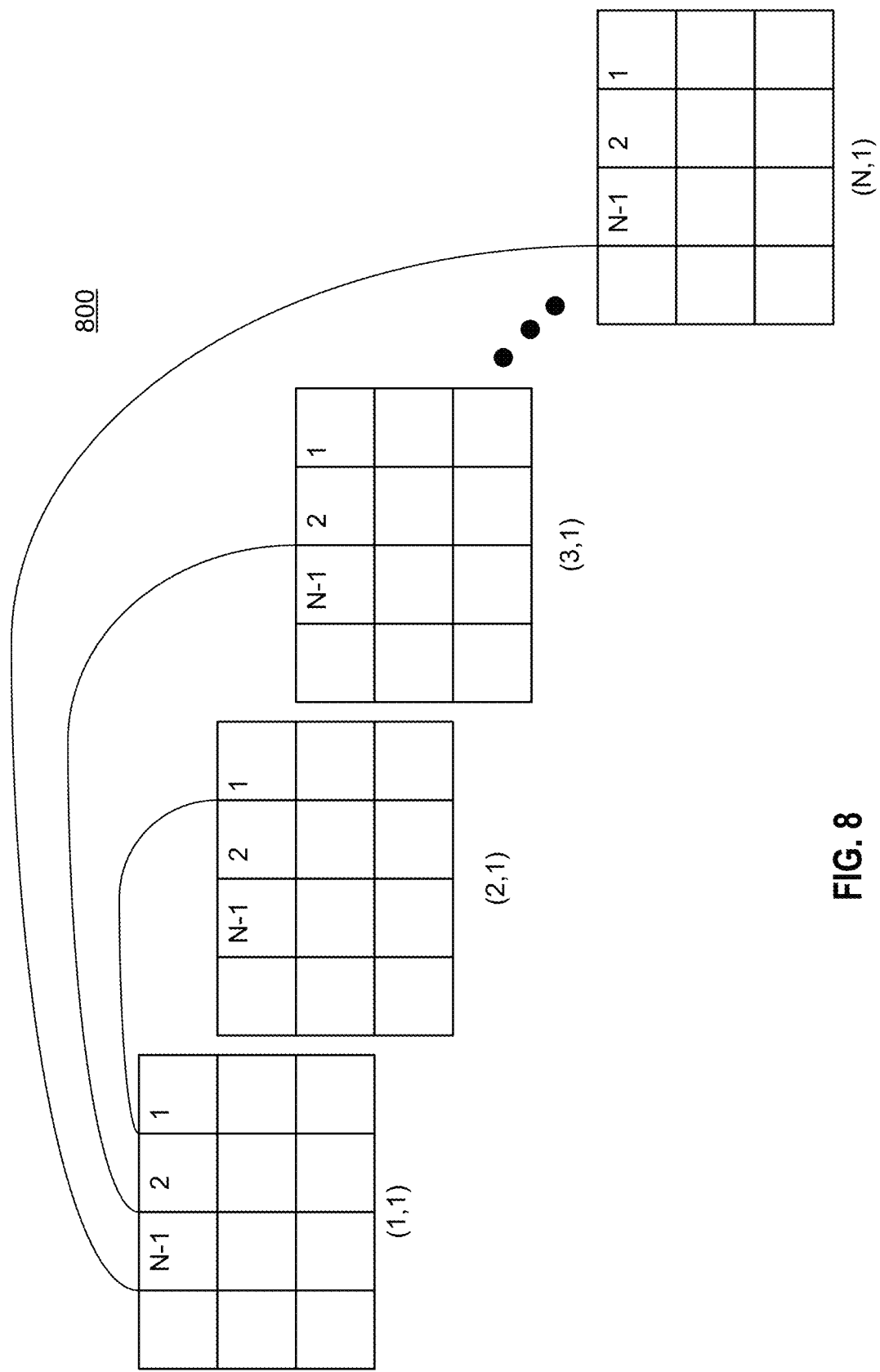
FIG. 8 is a diagram illustrating connections between local nodes of a group according to one embodiment.

FIG. 8 is a diagram illustrating connections between local nodes of a group 800 according to one embodiment. The group 800 includes nodes (1, 1), (2, 1), (3, 1) . . . (N, 1). Each of the nodes has a plurality of local connection ports 1, 2 . . . (N−1) each connected to a local-transmit waveguide (e.g., the local-transmit waveguides 310, 410, 510, 610, and 716 of FIGS. 3-7). Consistent with the techniques disclosed herein, each of the nodes has a direct link to each of all other nodes in the group 800. FIG. 8 shows partial connections of all of those direct links. For example, port 1 of node (1, 1) is directly connected to port 1 of the node (2, 1); port 2 of node (1, 1) is directly connected to port 2 of the node (3, 1); and port (N−1) of node (1, 1) is directly connected to port (N−1) of the node (N, 1). These links may be embodied in optical connectors and cables.

Figure 9:
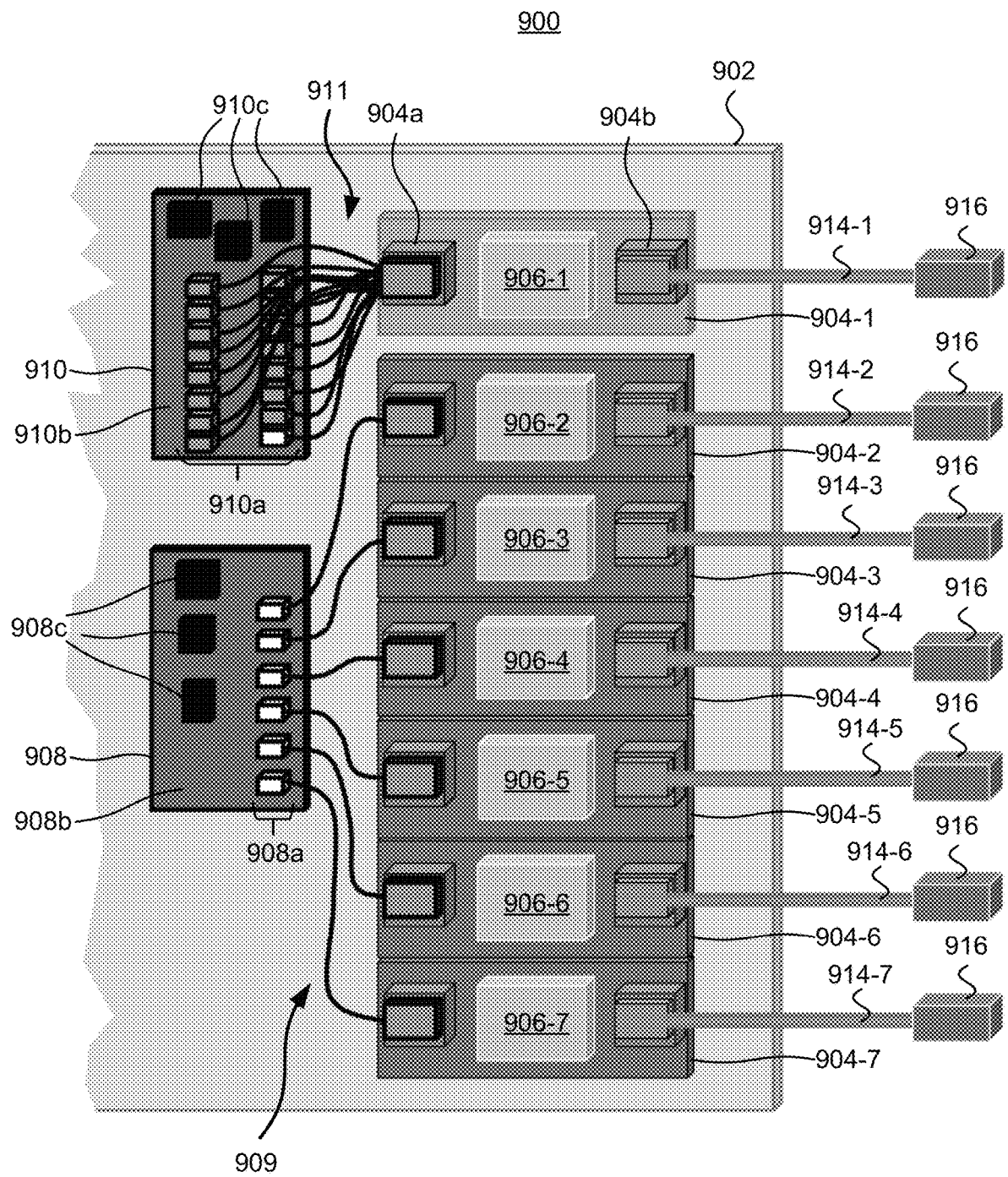
FIG. 9 is a diagram illustrating an implementation of a node consistent with an example embodiment.

FIG. 9 is a diagram illustrating an implementation of a node 900 consistent with an example embodiment. The node 900 includes a system board 902, a first circuit die 904-1, a plurality of second circuit die 904-2 to 904-7, and a plurality of electronic dies 906-1 to 906-7 (generally, "the electronic dies 906", collectively, "the electronic dies 906"), a first light-source assembly 908, and a second light-source assembly 910. Each of the first circuit die 904-1 and the second circuit die 904-2 to 904-7 is a photonic die (generally, "the photonic die 904", collectively, "the photonic dies 904"). The first circuit die 904-1 includes a first circuit similar to one of the first circuits 300-600 of FIGS. 3-6. Each of the second circuit dies 904-2 to 904-7 includes a second circuit similar to the second circuit 700 of FIG. 7. The system board 902 may be a printed circuit board that can provide support for mounting various components of the node 900. Each of the photonic dies 904 may be a semiconductor die. Each of the photonic dies 904 further includes connectors 904a and 904b (only labeled for the die 904-1 for simplicity) and interfaces to a respective electronic die 906. The connectors 904a and 904b are optical connectors. Each of the electronic dies 906 is disposed on a respective photonic die 904. Each of the electronic dies 906 is a semiconductor die that includes system interface logic and transmitter/receiver electronics to interface to a respective photonic die 904. Each of the electronic dies 906 may be integrated with a photonic die 904 using die-level package technologies or other semiconductor packaging techniques.

The first light source assembly 908 is configured to provide light sources to the second circuit dies 904-2 to 904-7. The first light source assembly 908 comprises laser light sources 908a, a circuit board 908b, and one or more electronic circuit dies 908c. Each of the laser light sources 908a may be a comb laser that provides multiple wavelengths to one of the second circuit dies 904-2 to 904-7 through an optical cable/waveguide 909. The laser light sources 908a and the one or more electronic circuit dies 908c are disposed on the circuit board 908b. The one or more electronic circuit dies 908c may provide control logic, power supplies, etc. for the first light source assembly 908.

The second light source assembly 910 is configured to provide light sources to the first circuit die 904-1. The second light source assembly 910 comprises single-wavelength laser light sources 910a, a circuit board 910b, and one or more electronic circuit dies 910c. Each of the laser light sources 910a may provide a signal wavelength that may be of the same wavelength or different wavelengths to the first circuit die 904-1 through an optical cable/waveguide 911. The laser light sources 910a and the one or more electronic circuit dies 910c are disposed on the circuit board 910b. The one or more electronic circuit dies 910c may provide control logic, power supplies, etc. for the second light source assembly 910.

The light sources 908a and 910a are respectively received at the connectors 904a of the photonic dies 904. The output of each of the photonic dies 904 is provided at the connectors 904b. The connectors 904b is connected to optical cables 914-1 to 914-7 (collectively, "the optical cables 914"). In some embodiments, the optical cable 914-1 provides only local direct links to local neighbors of the node 900. In some embodiments, the optical cable 914-1 may provide local direct links and global indirect links to local neighbors of the node 900. Each of the optical cable 914-2 to 914-7 provides a global direct link to a global twin and a global indirect link to local neighbors of the global twin. In some embodiments, each of the optical cables 914 may be coupled to a blindmate connector 916.

As can be appreciated, the configurations of the node 900 is provided as a non-limiting example and are not intended to limit the scope of this disclosure. Other configurations of a node are contemplated. For example, a node may include more or fewer photonic dies 904, electronic dies 906, the light source assemblies 908, 910, and other components of the node 900. In some embodiments, the single-wavelength laser light sources 910a may be replaced with a multi-wavelength laser light source (e.g., a comb laser).

In summary, the techniques disclosed herein include network solutions to flexibly scale up or scale down by adding to a node (e.g., 200) or removing from a node one or more first circuits (e.g., the first circuit 202) and/or second circuits (e.g., the second circuits 204). Each of those first circuit(s) and second circuit(s) can be configured to be a modular chip/data slice to facilitate expansion or reduction of a network system.

The techniques disclosed herein provide a system using a multi-chip silicon photonic node that can be scaled for larger fabric dimensions. A quad-node loop (QNL) routing logic allows a node to connect to all the other nodes either via direct node-to-node communication or via pass-through nodes, using wavelength selective routing silicon photonic nodes and all-to-all connected fibers among the local neighbor nodes and among the global twin nodes.

As disclosed herein, the network of photonic nodes interconnected with optical connectors and fibers are protocol agnostic. No protocol port-specifics, such as link training, need to be comprehended by the photonic nodes since MRFs and waveguides in pass-through nodes and fibers are physical transport media for the modulated wavelengths.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A photonic node, comprising:
a first circuit disposed on a first substrate, wherein the first circuit is configured to route light signals originated from the photonic node to local nodes of a local group in which the photonic node is a member, the first circuit comprises:
a plurality of first light waveguides disposed on the first substrate, the first light waveguides extending in a first direction, wherein the first light waveguides have first ends coupled to a first light source and second ends each coupled to a first output port configured to output light signals to the local nodes of a local group in which the photonic node is a member;
a plurality of first local receive light waveguides disposed on the first substrate, wherein each of the first local receive light waveguides is coupled to a first input port configured to receive light signals from the local nodes of the local group; and
a plurality of first micro-ring resonators disposed on the first substrate, wherein each of the local receive light waveguides is coupled to one of the first micro-ring resonators, wherein each of the first micro-ring resonators is configured to extract a different wavelength and coupled to a first photodetector; and
a second circuit disposed on a second substrate different from the first substrate, wherein the second circuit is configured to route light signals received from a node of an external group in which the photonic node is not a member, to one of the local nodes, the second circuit comprises:
a second light waveguide disposed on the second substrate, the second light waveguide extending in a second direction;
a plurality of third light waveguides disposed on the second substrate, the third light waveguides extending the first direction, wherein the second light waveguide has an intersection with each of the third light waveguides; and
a plurality of second micro-ring resonators disposed on the second substrate,
wherein each of the intersections is provided with a second micro-ring resonator of the second micro-ring resonators, each second micro-ring resonator being configured to route signals of a respective wavelength from the second light waveguide at an intersection to one of the third light waveguides at the intersection,
wherein each of the second micro-ring resonators is configured to route a different wavelength.

2. The photonic node of claim 1, wherein:
the second light waveguide is coupled to a second input port that is connected to the node of the external group; and
each of the third light waveguides is coupled to a second output port that is connected to a node of the local group.

3. The photonic node of claim 2, further comprising a third micro-ring resonator disposed on the second substrate and close to the second input port of the second light waveguide, wherein the third micro-ring resonator is coupled to a second photodetector.

4. The photonic node of claim 2, further comprising:
a global transmit light waveguide disposed on the second substrate, the global transmit light waveguide having a first portion and a second portion, wherein the first portion is in parallel to the second light waveguide and extends in the second direction, wherein the second portion is coupled to a second light source configured to emit multiple wavelengths; and
a plurality of first light modulators disposed on the second substrate and adjacent to the first portion of the global transmit light waveguide, wherein each of the first light modulators is configured to modulate a different wavelength.

5. The photonic node of claim 2, wherein the global transmit light waveguide is coupled to a third output port that is connected to the node of the external group.

6. The photonic node of claim 2, further comprising:
a plurality of second local receive light waveguides disposed on the second substrate, wherein each of the second local receive light waveguides is coupled to a third input port configured to receive light signals from a local node of the local group; and
a plurality of fourth micro-ring resonators disposed on the second substrate, wherein each of the second local receive light waveguides is coupled to one of the fourth micro-ring resonators, wherein each of the fourth micro-ring resonators is configured to extract a different wavelength.

7. The photonic node of claim 6, further comprising a plurality of second photodetectors each coupled to one of the fourth micro-ring resonators.

8. The photonic node of claim 1, wherein the first light source comprises a plurality of sub-light sources, each of the sub-light source is coupled to one of the first light waveguides and configured to provide a different wavelength.

9. The photonic circuit of claim 1, wherein the first light source is configured to provide multiple wavelengths, and the first circuit further comprises a fourth light waveguide extending in the second direction, wherein the fourth light waveguide is disposed adjacent to the first ends of the first light waveguides and is coupled to the first light source.

10. The photonic circuit of claim 9, wherein the first circuit further comprises a plurality of second light modulators each disposed between one of the first ends of the first light waveguides and the fourth light waveguide, wherein each of the second light modulators is configured to modulate a different wavelength.

11. A photonic node, comprising:
   a first circuit disposed on a first substrate, wherein the first circuit is configured to:
      route light signals originated from the photonic node to local nodes of a local group in which the photonic node is a member, and
      route light signals received from a node of a first external group in which the photonic node is not a member, to one of the local nodes, the first circuit comprises:
      a plurality of first light waveguides disposed on the first substrate, the first light waveguides extending in a first direction, wherein the first light waveguides have first ends coupled to a first light source and second ends each coupled to a first output port configured to output light signals to the local nodes;
      a plurality of first local receive light waveguides disposed on the first substrate, wherein each of the first local receive light waveguides is coupled to a first input port configured to receive light signals from a local node of the local group;
      a plurality of first micro-ring resonators disposed on the first substrate, wherein each of the first local receive light waveguides is coupled to a pair of the first micro-ring resonators, wherein each of the first micro-ring resonators is coupled to a first photodetector,
      a second light waveguide disposed on the first substrate, the second light waveguide extending in a second direction and intersecting the first light waveguides at a plurality of first intersections; and
      a plurality of second micro-ring resonators disposed on the first substrate, wherein each of the first intersections is provided with a second micro-ring resonator of the second micro-ring resonators, each second micro-ring resonator being configured to route signals of a respective wavelength from the second light waveguide at an intersection to one of the first light waveguides at the intersection, wherein each of the second micro-ring resonators is configured to route a different wavelength; and
   a second circuit disposed on a second substrate different from the first substrate, wherein the second circuit is configured to route light signals received from a node of a second external group in which the photonic node is not a member, to one of the local nodes, the second circuit comprises:
      a plurality of third light waveguides disposed on the second substrate, the third light waveguides extending the first direction, wherein each of the third light waveguides is coupled to a second output port that is connected to a node of the local group;
      a plurality of second local receive light waveguides disposed on the second substrate, wherein each of the second local receive light waveguides is coupled to a second input port configured to receive light signals from a local node of the local group;
      a plurality of third micro-ring resonators disposed on the second substrate, wherein each of the second local receive light waveguides is coupled to one of the third micro-ring resonators, wherein each of the third micro-ring resonators is coupled to a second photodetector;
      a fourth light waveguide disposed on the second substrate, the fourth light waveguide extending in the second direction and intersecting the third light waveguides at a plurality of second intersections;
      a plurality of fourth micro-ring resonators disposed on the second substrate, wherein each of the second intersections is provided with a fourth micro-ring resonator of the fourth micro-ring resonators, each fourth micro-ring resonator being configured to route signals of a respective wavelength from the fourth light waveguide at an intersection to one of the third light waveguides at the intersection, wherein each of the fourth micro-ring resonators is configured to route a different wavelength.

12. The photonic node of claim 11, wherein:
   the second light waveguide is coupled to a third input port that is connected to the node of the first external group; and
   the fourth light waveguide is coupled to a fourth input port that is connected to the node of the second external group.

13. The photonic node of claim 12, wherein:
   the first circuit further comprises a fifth micro-ring resonator disposed on the first substrate and close to the third input port of the second light waveguide, wherein the fifth micro-ring resonator is coupled to a third photodetector; and
   the second circuit further comprises a sixth micro-ring resonator disposed on the second substrate and close to the fourth input port of the fourth light waveguide, wherein the sixth micro-ring resonator is coupled to a fourth photodetector.

14. The photonic node of claim 12, wherein:
   the first circuit further comprises:
      a first global transmit light waveguide disposed on the first substrate, the first global transmit light waveguide having a first portion and a second portion, wherein the first portion is in parallel to the second light waveguide and extends in the second direction, wherein the second portion is coupled to a second light source configured to emit multiple wavelengths; and
      a plurality of first light modulators disposed on the first substrate and adjacent to the first portion of the first global transmit light waveguide, wherein each of the first light modulators is configured to modulate a different wavelength; and
   the second circuit further comprises:
      a second global transmit light waveguide disposed on the second substrate, the second global transmit light waveguide having a third portion and a fourth portion, wherein the third portion is in parallel to the fourth light waveguide and extends in the second direction, wherein the fourth portion is coupled to a third light source configured to emit multiple wavelengths; and
      a plurality of second light modulators disposed on the second substrate and adjacent to the third portion of the second global transmit light waveguide, wherein each of the second light modulators is configured to modulate a different wavelength.

15. The photonic node of claim 14, wherein:
the first global transmit light waveguide is coupled to a third output port that is connected to the node of the first external group; and
the second global transmit light waveguide is coupled to a fourth output port that is connected to the node of the second external group.

16. The photonic node of claim 11, wherein the first light source comprises a plurality of sub-light sources, each of the sub-light source is coupled to one of the first light waveguides and configured to provide a different wavelength.

17. The photonic circuit of claim 11, wherein the first light source is configured to provide multiple wavelengths, and the first circuit further comprises a fifth light waveguide extending in the second direction, wherein the fifth light waveguide is disposed adjacent to the first ends of the first light waveguides and is coupled to the first light source.

\* \* \* \* \*